(12) United States Patent
Takiue

(10) Patent No.: US 9,975,998 B2
(45) Date of Patent: May 22, 2018

(54) POLYIMIDE COPOLYMER, AND PRODUCTION METHOD FOR SAME

(71) Applicant: SOMAR CORPORATION, Tokyo (JP)

(72) Inventor: Yoshiyasu Takiue, Tokyo (JP)

(73) Assignee: SOMAR CORPORATION, Tokyo (JP)

( * ) Notice: Subject to any disclaimer, the term of this patent is extended or adjusted under 35 U.S.C. 154(b) by 0 days. days.

(21) Appl. No.: 14/785,273

(22) PCT Filed: Apr. 17, 2014

(86) PCT No.: PCT/JP2014/060974
§ 371 (c)(1),
(2) Date: Oct. 16, 2015

(87) PCT Pub. No.: WO2014/171520
PCT Pub. Date: Oct. 23, 2014

(65) Prior Publication Data
US 2016/0083521 A1 Mar. 24, 2016

(30) Foreign Application Priority Data
Apr. 19, 2013 (JP) .................................. 2013-088941

(51) Int. Cl.
*C08G 73/10* (2006.01)
*C09D 179/08* (2006.01)

(52) U.S. Cl.
CPC ....... *C08G 73/1085* (2013.01); *C08G 73/105* (2013.01); *C08G 73/1042* (2013.01); *C08G 73/1064* (2013.01); *C08G 73/1067* (2013.01); *C08G 73/1071* (2013.01); *C09D 179/08* (2013.01)

(58) Field of Classification Search
CPC ............ C08G 73/1042; C08G 73/1067; C08G 73/1085
See application file for complete search history.

(56) References Cited

U.S. PATENT DOCUMENTS

| 4,629,777 A | 12/1986 | Pfeifer | |
| 5,229,485 A | 7/1993 | Kramer et al. | |
| 2009/0061096 A1* | 3/2009 | Praserthdam | C08G 73/1007 427/340 |
| 2013/0018167 A1* | 1/2013 | Itatani | C08G 73/1042 528/353 |

FOREIGN PATENT DOCUMENTS

| CN | 102134396 A | 7/2011 | |
| JP | 59-219330 A | 12/1984 | |
| JP | 4-261431 A | 9/1992 | |
| JP | 7-292106 A | 11/1995 | |
| JP | 2009-84339 A | 4/2009 | |
| JP | 2011-122079 A | 6/2011 | |
| JP | 5027514 | * | 2/2012 |
| WO | WO 2006/057036 A1 | 6/2006 | |
| WO | WO 2008/12038 | * | 10/2008 |

OTHER PUBLICATIONS

International Search Report, issued in PCT/JP2014/060974, dated May 27, 2014.
Japanese Office Action dated Aug. 30, 2016, for Japanese Application No. 2013-088941 with the English translation.
Chinese Office Action and Search Report dated Sep. 8, 2016 for Application No. 201480022343.6.

* cited by examiner

*Primary Examiner* — Gregory Listvoyb
(74) *Attorney, Agent, or Firm* — Birch, Stewart, Kolasch & Birch, LLP

(57) ABSTRACT

The present invention provides: a polyimide copolymer which satisfies solvent solubility, storage stability and heat resistance at high levels and has excellent utility; and a method of producing the same. The polyimide copolymer is obtained by copolymerizing an oligomer of polyimide copolymer, which is obtained by copolymerizing (A) a pyromellitic dianhydride and (B) at least one diamine and/or diisocyanate represented by the following Formula (1) or (2):

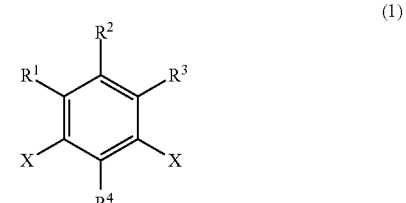

(1)

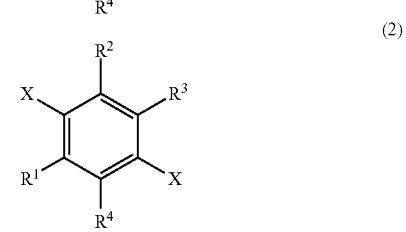

(2)

(wherein, X represents an amino group or an isocyanate group; $R^1$ to $R^4$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^4$ is not a hydrogen atom),
with (C) second acid dianhydride different from the (A).

7 Claims, 1 Drawing Sheet

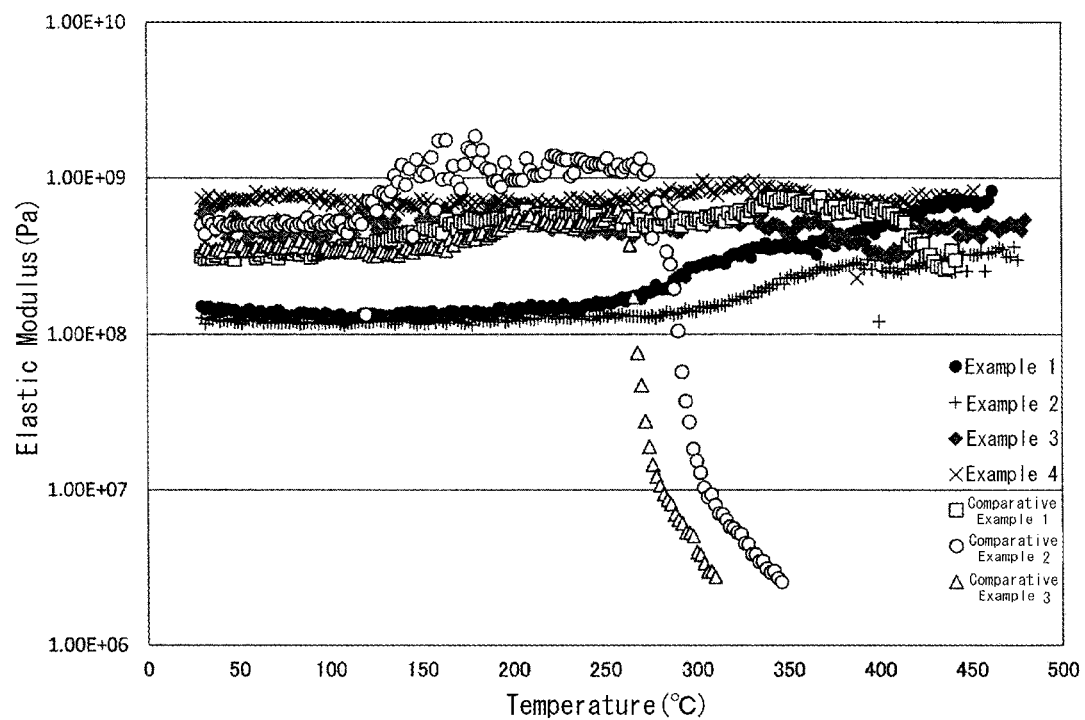

POLYIMIDE COPOLYMER, AND PRODUCTION METHOD FOR SAME

TECHNICAL FIELD

The present invention relates to a polyimide copolymer and a method of producing the same. More particularly, the present invention relates to: a polyimide copolymer which satisfies solvent solubility, storage stability and heat resistance at high levels and has excellent utility; and a method of producing the same.

BACKGROUND ART

Among organic materials, polyimides are polymeric materials that have the highest levels of heat resistance, chemical resistance and electrical insulating properties. In the electrical and electronic industry, for example, "KAPTON (registered trademark)" manufactured by DuPont, which is synthesized from pyromellitic dianhydride (PMDA) and 4,4'-diaminodiphenyl ether (pDADE), and "UPILEX (registered trademark)" manufactured by Ube Industries, Ltd., which is synthesized from biphenyltetracarboxylic dianhydride (BPDA) and p-phenylene diamine (PPD), are widely used as heat-resistant insulating materials. However, polyimides have a drawback of hardly soluble in solvents as an adverse effect of having excellent chemical resistance. Therefore, polyimides are poor in terms of processability and are mainly distributed in the form of films.

Polyimide films are produced by dissolving an acid dianhydride having two acid anhydride groups in the molecule and a diamine having two amino groups in the molecule in a solvent to synthesize a polyimide precursor varnish called "polyamic acid", coating and drying this precursor varnish, and then heating the resultant at about 350° C. It has been strongly desired to handle polyimides in a solution state, and a number of developments have been made in solvent-soluble polyimides.

However, in order to obtain a solvent-soluble polyimide, it is generally required to use materials having high solubility, that is, low heat resistance; therefore, the resulting polyimide has a low heat resistance and a low chemical resistance. Meanwhile, as a method of handling polyimide as a solution without sacrificing heat resistance and chemical resistance, there is a method in which a user forms a coating film with a polyamic acid solution and subsequently performing imidization. However, since not only such a polyamic acid solution is easily affected by the humidity and handling and storage thereof are difficult but also a heat treatment at about 350° C. is required for imidization of polyamic acid, the use of a polyamic acid solution is limited to coating on heat-resistant materials. Under such circumstances, examples of a technology relating to a solvent-soluble polyimide include those disclosed in Patent Documents 1 and 2.

RELATED ART DOCUMENTS

Patent Documents

Patent Document 1: Japanese Unexamined Patent Application Publication No. 2011-122079

Patent Document 2: Japanese Unexamined Patent Application Publication No. S59-219330

SUMMARY OF THE INVENTION

Problems to be Solved by the Invention

However, in the polyimide copolymers obtained in Patent Documents 1 and 2, in exchange for solubilizing them to organic solvents, the heat resistance and the mechanical strength are reduced. Meanwhile, at present, improvements in heat resistance and mechanical strength for remedying these problems do not necessarily yield satisfactory results from the practical standpoint in that, for example, to maintain the polyimide copolymers in a state of being dissolved in an organic solvent is made difficult and the storage stability is reduced.

In view of the above, an object of the present invention is to provide: a polyimide copolymer which satisfies solvent solubility, storage stability and heat resistance at high levels and has excellent utility; and a method of producing the polyimide copolymer.

Means for Solving the Problems

The present inventor intensively studied to solve the above-described problems and consequently discovered that the problems can be solved by copolymerizing an oligomer of polyimide copolymer, which is obtained by copolymerization of a prescribed acid dianhydride and a prescribed diamine and/or diisocyanate, with a second acid dianhydride, thereby completing the present invention.

That is, the polyimide copolymer of the present invention is characterized in that it is obtained by copolymerizing an oligomer of polyimide copolymer, which is obtained by copolymerizing (A) a pyromellitic dianhydride and (B) at least one diamine and/or diisocyanate represented by the following Formula (1) or (2):

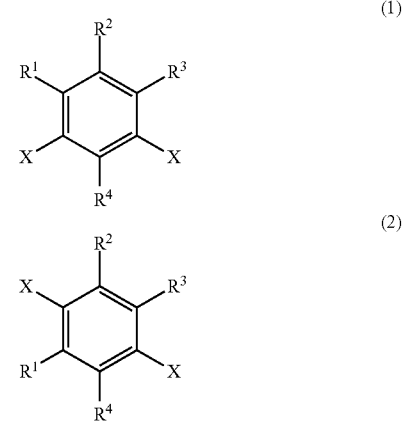

(wherein, X represents an amino group or an isocyanate group; $R^1$ to $R^4$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^4$ is not a hydrogen atom), with (C) a second acid dianhydride different from the (A).

It is noted here that, unless otherwise specified, the term "component (C)" used in the present invention hereinafter refers to an acid dianhydride different from the above-described component (A).

In the polyimide copolymer of the present invention, it is preferred that the oligomer of polyimide copolymer have amino group-terminals. The reason for this is as follows. That is, it is believed that the copolymer oligomer composed of the above-described components (A) and (B) can be solubilized to organic solvent at a high concentration and, by completely blocking the acid anhydride groups in the component (A) with diamine of the component (B), the acid anhydride groups of the component (A) are prevented from reacting with the component (C) and a monomer effective for imparting the heat resistance of the component (A) can thus be efficiently introduced into the resulting resin structure while maintaining the solubility in the organic solvent.

In the polyimide copolymer of the present invention, it is preferred that two of the $R^1$ to $R^4$ in the Formula (1) or (2) of the (B) be ethyl groups and the other two be a methyl group and a hydrogen atom. Further, in the polyimide copolymer of the present invention, it is preferred that the (C) second acid dianhydride be at least one selected from the group consisting of 3,3',4,4'-biphenyltetracarboxylic dianhydride, 4,4'-oxydiphthalic dianhydride, diphenylsulfone-3,3',4,4'-tetracarboxylic dianhydride, 3,3',4,4'-benzophenonetetracarboxylic dianhydride, 2,2'-bis[(dicarboxyphenoxy)phenyl]propane dianhydride and ethylene glycol-bis-trimellitic anhydride ester; and that, as (D) second diamine and/or diisocyanate, at least one selected from the group consisting of compounds represented by the following Formulae (3) to (12):

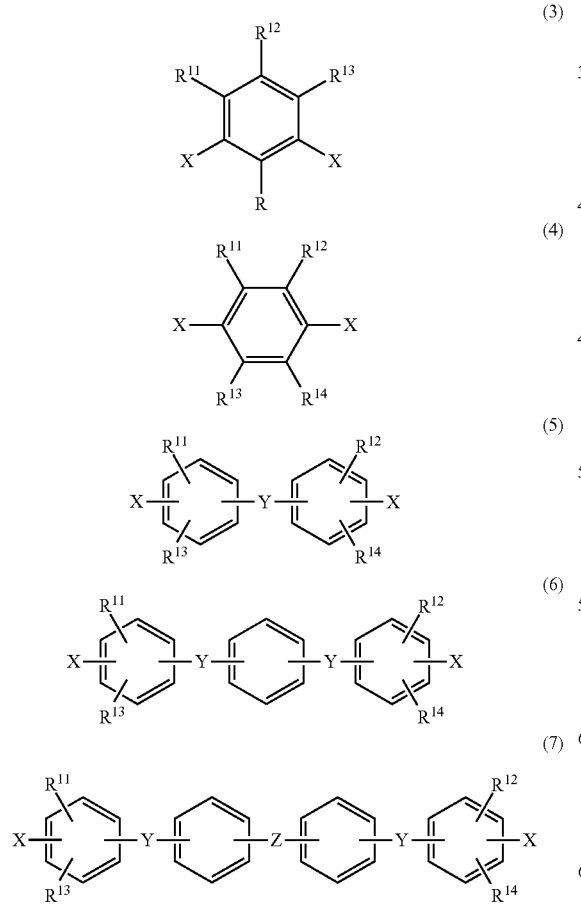

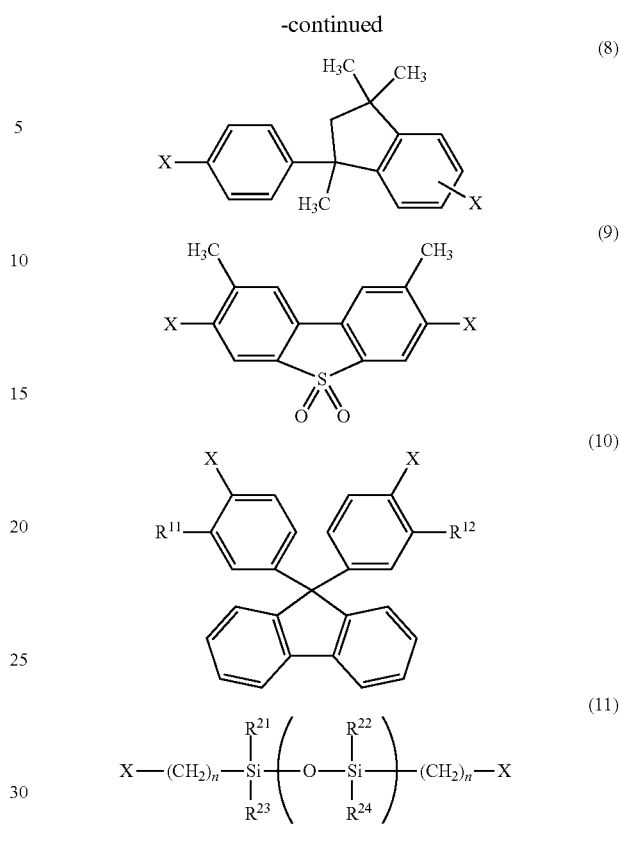

(wherein, X represents an amino group or an isocyanate group; $R^{11}$ to $R^{14}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group; Y and Z each represent

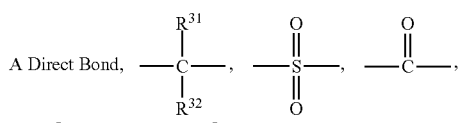

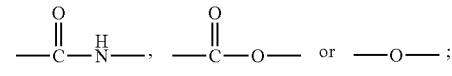

$R^{21}$ to $R^{24}$ each independently represent an alkyl group having 1 to 4 carbon atoms or a phenyl group; $R^{31}$ and $R^{32}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group)

be copolymerized with the oligomer of polyimide copolymer along with the (C) second acid dianhydride.

Still further, in polyimide copolymer of the present invention, it is preferred that no glass transition temperature be observed below 350° C., and it is more preferred that no glass transition temperature be observed below 500° C.

The method of producing a polyimide copolymer according to the present invention is characterized by comprising:

the oligomer production step of producing an oligomer of polyimide copolymer by copolymerizing (A) a pyromellitic dianhydride and (B) at least one diamine and/or diisocyanate represented by the following Formula (1) or (2):

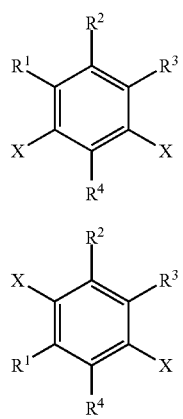

(wherein, X represents an amino group or an isocyanate group; $R^1$ to $R^4$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^4$ is not a hydrogen atom); and the polyimide copolymer production step of producing a polyimide copolymer by copolymerizing (C) a second acid dianhydride with the oligomer of polyimide copolymer produced in the oligomer production step.

In the method of producing a polyimide copolymer according to the present invention, it is preferred that the oligomer production step be carried out in organic solvent in the presence of a catalyst at a temperature of 150 to 200° C. In the method of producing a polyimide copolymer according to the present invention, it is also preferred that two of the $R^1$ to $R^4$ in the Formula (1) or (2) of the (B) be ethyl groups and the other two be a methyl group and a hydrogen atom. Further, in the method of producing a polyimide copolymer according to the present invention, it is preferred that the (C) second acid dianhydride be at least one selected from the group consisting of 3,3',4,4'-biphenyltetracarboxylic dianhydride, 4,4'-oxydiphthalic dianhydride, diphenylsulfone-3,3',4,4'-tetracarboxylic dianhydride, 3,3',4,4'-benzophenonetetracarboxylic dianhydride, 2,2'-bis [(dicarboxyphenoxy)phenyl]propane dianhydride and ethylene glycol-bis-trimellitic anhydride ester; and that, as (D) second diamine and/or diisocyanate, at least one selected from the group consisting of compounds represented by the following Formulae (3) to (12):

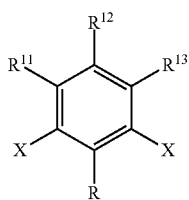

-continued

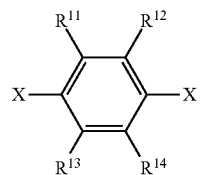

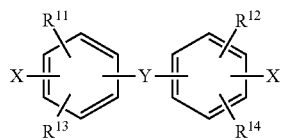

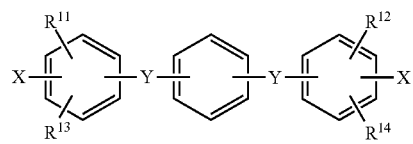

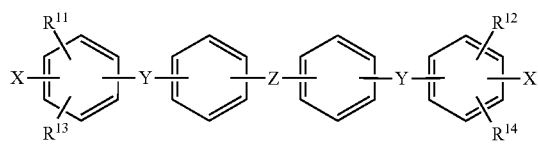

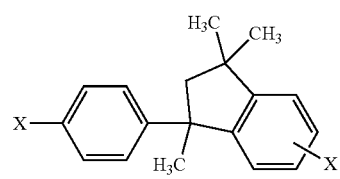

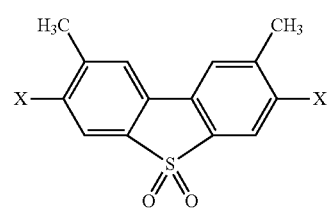

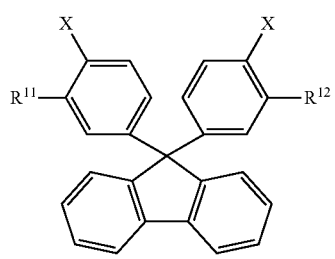

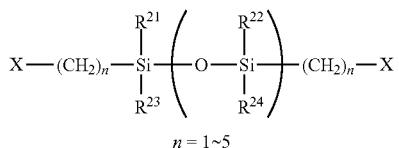

$n = 1 \sim 5$

-continued

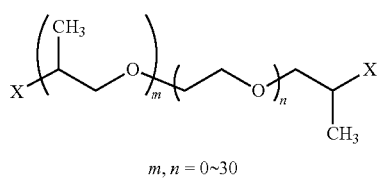

$m, n = 0\sim30$ (wherein, X represents an amino group or an isocyanate group; $R^{11}$ to $R^{14}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group; Y and Z each represent

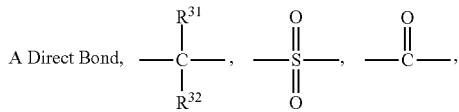

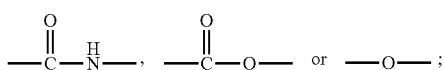

$R^{21}$ to $R^{24}$ each independently represent an alkyl group having 1 to 4 carbon atoms or a phenyl group; $R^{31}$ and $R^{32}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group)

be copolymerized with the oligomer of polyimide copolymer along with the (C) second acid dianhydride.

Effects of the Invention

According to the present invention, a polyimide copolymer which satisfies solvent solubility, storage stability and heat resistance at high levels and has excellent utility and a method of producing the polyimide copolymer can be provided.

BRIEF DESCRIPTION OF THE DRAWING

FIG. 1 is a graph showing the temperature dependency of the elastic moduli of the polyimide copolymers obtained in Examples and Comparative Examples.

MODE FOR CARRYING OUT THE INVENTION

Modes of the present invention will now be described in detail.

The polyimide copolymer of the present invention is obtained by copolymerizing an oligomer of polyimide copolymer (hereinafter, also simply referred to as "oligomer"), which is obtained by copolymerizing (A) a pyromellitic dianhydride and (B) at least one diamine and/or diisocyanate represented by the following Formula (1) or (2):

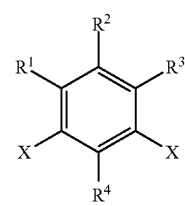

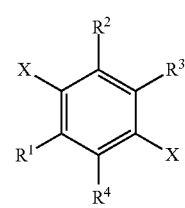

(wherein, X represents an amino group or an isocyanate group; $R^1$ to $R^4$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^4$ is not a hydrogen atom), with (C) a second acid dianhydride. By using an oligomer having the above-described structure to polymerize the polyimide copolymer, the solvent solubility, storage stability and heat resistance can be satisfied at high levels.

The polyimide copolymer of the present invention comprises, in its skeleton, an oligomer obtained by copolymerizing (A) a pyromellitic dianhydride with a diamine and/or diisocyanate represented by the Formula (1) or (2), and a unit derived from this oligomer is the part contributing to the heat resistance of the polyimide copolymer of the present invention. As described below, in the polyimide copolymer of the present invention, (D) second diamine and/or diisocyanate may also be copolymerized with the oligomer of polyimide copolymer along with the (C) second acid dianhydride. The following Formula (13) is one example of the structural formula of the polyimide copolymer of the present invention, which is obtained by copolymerizing the oligomer of polyimide copolymer with biphenyltetracarboxylic dianhydride (BPDA) as the (C) second acid dianhydride and 2,2-bis[4-(4-aminophenoxy)phenyl]propane (BAPP) as the (D) second diamine:

(13)

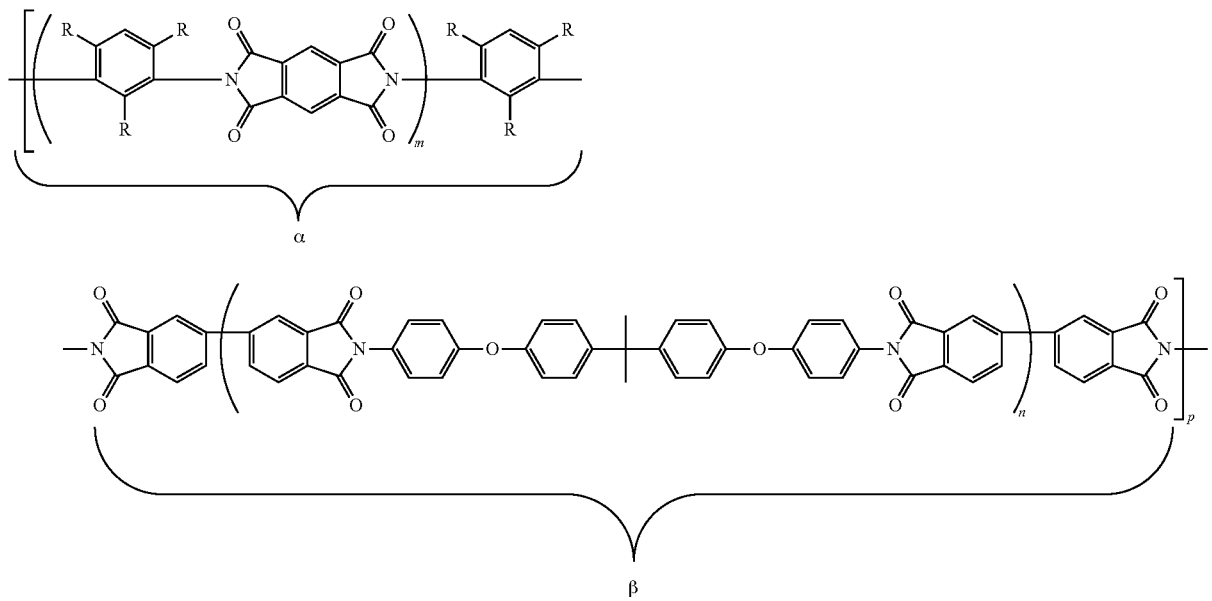

(wherein, two of three Rs of diethyltoluene diamine are ethyl groups and the other R is a methyl group).

The unit represented by α in the Formula (13) is derived from the oligomer of polyimide copolymer of the present invention, and this unit α allows excellent solvent solubility, storage stability and heat resistance to be expressed at high levels. Meanwhile, the unit represented by β in the Formula (13) is derived from the (C) second acid dianhydride and the (D) second diamine and/or diisocyanate. By appropriately selecting the second acid dianhydride and the second diamine and/or diisocyanate, a variety of physical properties can be imparted to the polyimide copolymer. It is preferred that the oligomer of the present invention have amino group-terminals; and that the molar ratio between the components (A) and (B) constituting the oligomer be in a range of 1:1.02 to 1:3. The molar ratio between the oligomer and the second diamine and/or diisocyanate is preferably 5:1 to 1:5 or so, although it varies depending on the combination of the second acid dianhydride and the second diamine and/or diisocyanate. Further, the glass transition temperature of the polyimide copolymer can be changed by appropriately changing this molar ratio; however, in order to allow the effects of the present invention to be sufficiently exerted, it is preferred that the polyimide copolymer have no glass transition temperature observed below 350° C. and it is more preferred that the polyimide copolymer have no glass transition temperature observed below 500° C.

The polyimide copolymer of the present invention has a mass-average molecular weight of preferably 20,000 to 200,000, more preferably 35,000 to 150,000. When the mass-average molecular weight of the polyimide copolymer is outside this range, the ease of handling is deteriorated. In cases where the polyimide copolymer of the present invention is dissolved in organic solvent, the concentration of the polyimide copolymer in the organic solvent can be, for example, but not particularly restricted to, 5 to 35% by mass or so. The polyimide copolymer can be used at a concentration of less than 5% by mass; however, when the concentration is low, the efficiency of operations such as coating of the polyimide copolymer is reduced. Meanwhile, when the concentration exceeds 35% by mass, the fluidity of the polyimide copolymer is poor and coating and the like of the polyimide copolymer thus becomes difficult, which also deteriorates the workability. Here, the preferred polymerization degree of the oligomer cannot be generalized because it is determined based on its relationship with the unit β; however, the mass-average molecular weight of the oligomer is preferably 550 to 16,000 or so.

In the polyimide copolymer of the present invention, it is preferred that the component (B) be diethyltoluene diamine represented by the Formula (1) or (2) wherein two of the $R^1$ to $R^4$ are ethyl groups and the other two are a methyl group and a hydrogen atom, which diethyltoluene diamine can be obtained easily and inexpensively and enables to favorably attain the effects of the present invention.

In the polyimide copolymer of the present invention, it is preferred that the (C) second acid dianhydride be at least one selected from the group consisting of 3,3',4,4'-biphenyltetracarboxylic dianhydride, 4,4'-oxydiphthalic dianhydride, diphenylsulfone-3,3',4,4'-tetracarboxylic dianhydride, 3,3', 4,4'-benzophenonetetracarboxylic dianhydride, 2,2'-bis[(dicarboxyphenoxy)phenyl]propane dianhydride and ethylene glycol-bis-trimellitic anhydride ester.

Further, in the polyimide copolymer of the present invention, as described above, (D) second diamine and/or diisocyanate may also be copolymerized with the oligomer of polyimide copolymer along with the (C) second acid dianhydride. The (D) second diamine and/or diisocyanate is preferably at least one selected from the group consisting of compounds represented by the following Formulae (3) to (12):

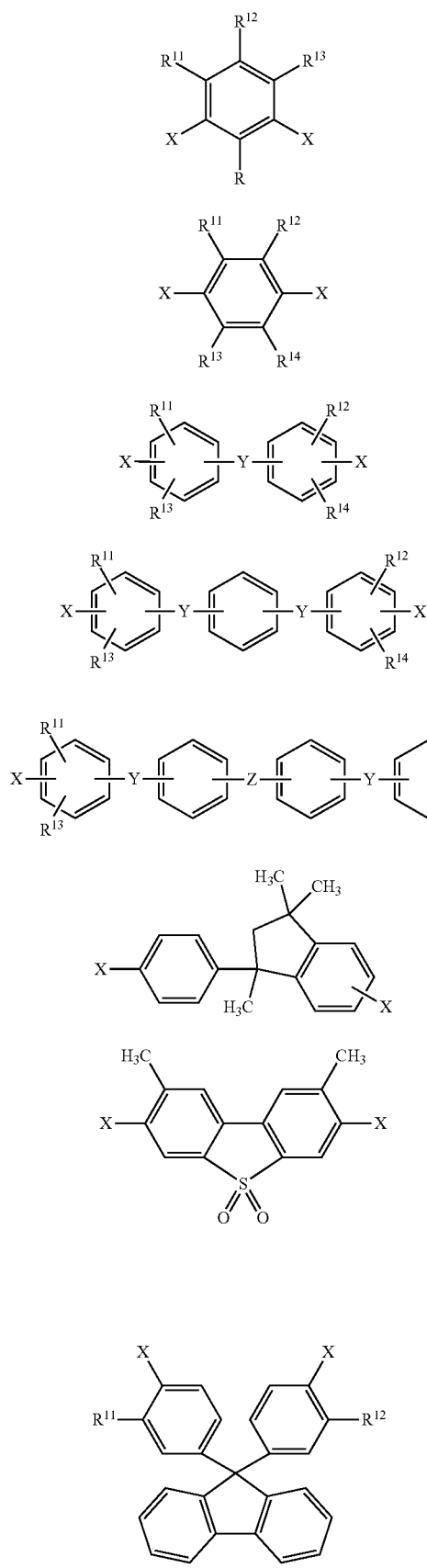

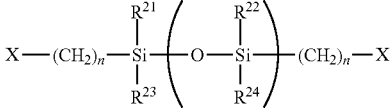

$n = 1\sim5$

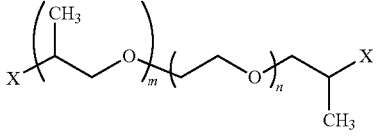

$m, n = 0\sim30$ (wherein, X represents an amino group or an isocyanate group; $R^{11}$ to $R^{14}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group; Y and Z each represent

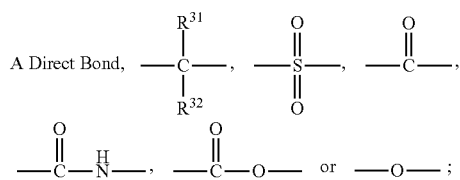

$R^{21}$ to $R^{24}$ each independently represent an alkyl group having 1 to 4 carbon atoms or a phenyl group; $R^{31}$ and $R^{32}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group). By selecting the above-described compounds as the second acid dianhydride and the second diamine, the effects of the present invention can be favorably attained.

In the polyimide copolymer of the present invention, an acid dianhydride other than the second acid dianhydride and a diamine and/or diisocyanate other than the second diamine and/or diisocyanate may also be copolymerized in such a range that does not impair the solubility to organic solvent and the heat resistance; however, preferably, the amount of the oligomer of polyimide copolymer to be incorporated with respect to the total amount of the polyimide copolymer of the present invention is not less than 50% by mass. Further, in the oligomer of the present invention as well, other diamine and acid dianhydride may also be incorporated into the components (A) and (B) in such a range that does not impair the solubility to organic solvent and the heat resistance. In this case, the total amount of the components (A) and (B) is preferably not less than 50% by mass of the total amount of the oligomer of polyimide copolymer.

The polyimide copolymer of the present invention can be dissolved in organic solvent and, as this organic solvent, for example, N-methyl-2-pyrrolidone, N,N-dimethylacetamide, sulfolane, N,N-dimethylformamide, N,N-diethylacetamide, gamma-butyrolactone, alkylene glycol monoalkyl ether, alkylene glycol dialkyl ether, alkylcarbitol acetate or a benzoic acid ester can be used. These organic solvents may be used individually, or two or more thereof may be used in combination.

When producing a molded article using the polyimide copolymer of the present invention, the production method is not particularly restricted and a known method can be employed. Examples thereof include a method in which the polyimide copolymer of the present invention is coated on the surface of a substrate and the resultant is then dried to evaporate a solvent, followed by molding into the form of a coating film, a film or a sheet; and a method in which the polyimide copolymer of the present invention is injected into a die and a solvent is then removed by evaporation to obtain a molded article.

As a method of preparing a coating film, a film or a sheet from the polyimide copolymer of the present invention, the polyimide copolymer of the present invention can be coated on the surface of a substrate by a known method such as spin coating, dip coating, spray coating or casting in accordance with the viscosity and the like thereof and subsequently dried.

As the substrate, an arbitrary substrate may be used in accordance with the intended use of the final product. Examples of the material of the substrate include fiber products such as fabrics; glasses; synthetic resins such as polyethylene terephthalate, polyethylene naphthalate, polyethylene, polycarbonate, triacetylcellulose, cellophane, polyimide, polyamide, polyphenylene sulfide, polyether imide, polyether sulfone, aromatic polyamide and polysulfone; metals; ceramics; and papers. The substrate may be transparent or colored with various pigments or dyes incorporated into the material constituting the substrate, or the surface of the substrate may be coated with a resin containing various pigments or dyes. Further, the surface of the substrate may be processed into a mat form by, for example, physical etching such as sand blasting, chemical etching with a chemical solution or formation of irregularities by coating with a filler-containing resin, or an adhesion-promoting layer may be formed on the surface by plasma treatment, corona treatment, primer coating or the like.

For drying of the thus coated polyimide copolymer of the present invention, a conventional heat-drying furnace can be employed. Examples of the atmosphere inside the drying furnace include air and inert gases (nitrogen and argon). The drying temperature can be selected as appropriate in accordance with the boiling temperature of the solvent in which the polyimide copolymer of the present invention is dissolved, and it may be usually 80 to 350° C., preferably 100 to 320° C., particularly preferably 120 to 250° C. The drying time can be selected as appropriate in accordance with the thickness, concentration and solvent type, and it may be 1 second to 360 minutes or so.

After the drying, a product having the polyimide copolymer of the present invention as a coating film can be directly obtained, or the resulting coating film can be separated from the substrate to obtain a film.

In cases where a molded article is produced using the polyimide copolymer of the present invention, for example, a filler such as silica or alumina, mica, carbon powder, a pigment, a dye, a polymerization inhibitor, a thickening agent, a thixotropic agent, a suspending agent, an antioxidant, a dispersant, a pH adjuster, a surfactant, various organic solvents and various resins can be added.

Further, in cases where a molded article is obtained using a die, a molded article can be obtained by injecting a prescribed amount of the polyimide copolymer of the present invention into a die (particularly preferably a rotary die) and then drying the injected polyimide copolymer at the same temperature for the same time period as in the molding conditions of a film or the like.

The polyimide copolymer of the present invention has excellent heat resistance and is, therefore, useful for heat resistance-requiring coating agents, adhesives, insulation coating materials such as electric wires, inks, paints, interlayer insulating films, ultra-thin films and the like.

Next, the method of producing a polyimide copolymer according to the present invention will be described.

The method of producing a polyimide copolymer according to the present invention comprises: the oligomer production step of producing an oligomer of polyimide copolymer; and the polyimide copolymer production step of producing a polyimide copolymer using the thus obtained oligomer of polyimide copolymer. The oligomer production step and the polyimide copolymer production step will be described separately.

<Oligomer Production Step>

First, the oligomer production step according to the present invention will be described. In order to obtain a polyimide oligomer, either a thermal imidization method which thermally carries out dehydration ring-closure or a chemical imidization method using a dehydrating agent can be employed. The thermal imidization method and the chemical imidization method will be described below in the order mentioned.

<Thermal Imidization Method>

In the oligomer production step of the present invention, an oligomer of polyimide copolymer is produced by copolymerizing (A) a pyromellitic dianhydride and (B) at least one diamine and/or diisocyanate represented by the following Formula (1) or (2):

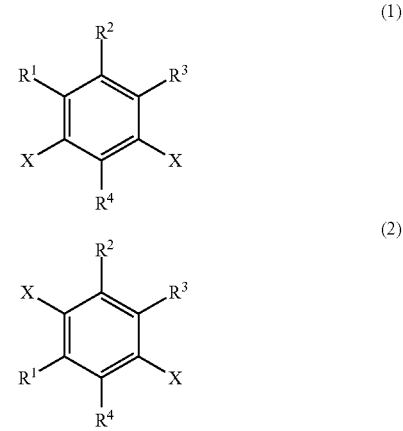

(wherein, X represents an amino group or an isocyanate group; $R^1$ to $R^4$ each independently represent a hydrogen atom, an alkyl group having 1 to 4 carbon atoms, an alkenyl group having 2 to 4 carbon atoms or an alkoxy group having 1 to 4 carbon atoms; and at least one of the $R^1$ to $R^4$ is not a hydrogen atom).

In this step, the components (A) and (B) are polymerized, preferably in organic solvent in the presence of a catalyst at a temperature of 150 to 200° C. It is noted here that, as described above, the acid dianhydride and the diamine and/or diisocyanate that are used in the oligomer production step of the present invention may also contain an acid dianhydride and a diamine and/or a diisocyanate other than the above-described acid dianhydride and the above-described diamine and/or diisocyanate, to such an extent that does not impair the solubility and heat resistance of the polyimide copolymer of the present invention. In the oligomer production step of the present invention, it is preferred that the component (B) be diethyltoluene diamine represented by the Formula (1) or (2) wherein two of the $R^1$ to $R^4$ are ethyl groups and the other two are a methyl group and a hydrogen atom.

In the oligomer production step of the present invention, polymerization can be carried out by any known method and the polymerization method is not particularly restricted. For example, a method in which the entire amount of the above-described acid dianhydride component is added to organic solvent in advance and polymerization is carried out by subsequently adding the above-described diamine to this organic solvent in which the acid dianhydride has been dissolved may be employed, or a method in which the entire amount of the above-described diamine is added to organic solvent in advance and polymerization is carried out by subsequently adding the above-described acid dianhydride to this organic solvent in which the diamine has been dissolved may be employed.

The organic solvent used in the oligomer production step of the present invention is not particularly restricted and, for example, N-methyl-2-pyrrolidone, N,N-dimethylacetamide, sulfolane, N,N-dimethylformamide, N,N-diethylacetamide, gamma-butyrolactone, alkylene glycol monoalkyl ether, alkylene glycol dialkyl ether, alkylcarbitol acetate or a benzoic acid ester can be preferably used. These organic solvents may be used individually, or two or more thereof may be used in combination.

In the oligomer production step of the present invention, the polymerization is carried out at a temperature of 150 to 200° C. When the polymerization temperature is lower than 150° C., there may be a case where imidization does not progress or is not completed, whereas when the polymerization temperature is higher than 200° C., oxidation of the solvent and unreacted materials occurs and the resin concentration is increased due to evaporation of the solvent. The polymerization temperature is preferably 160 to 195° C.

The catalyst used in the oligomer production step of the present invention is not particularly restricted, and any known imidization catalyst can be used. For example, pyridine can be usually used as an imidization catalyst; however, in addition thereto, examples of the imidization catalyst include substituted or unsubstituted nitrogen-containing heterocyclic compounds; N-oxide compounds of nitrogen-containing heterocyclic compounds; substituted or unsubstituted amino acid compounds; and hydroxyl group-containing aromatic hydrocarbon compounds and aromatic heterocyclic compounds. Particularly, for example, lower alkyl imidazoles such as 1,2-dimethylimidazole, N-methylimidazole, N-benzyl-2-methylimidazole, 2-methylimidazole, 2-ethyl-4-methylimidazole and 5-methylbenzimidazole, imidazole derivatives such as N-benzyl-2-methylimidazole, substituted pyridines such as isoquinoline, 3,5-dimethylpyridine, 3,4-dimethylpyridine, 2,5-dimethylpyridine, 2,4-dimethylpyridine and 4-n-propylpyridine, and p-toluenesulfonic acid can be preferably used. The amount of the imidization catalyst to be used is 0.01 to 2 times equivalent, particularly preferably 0.02 to 1 time equivalent or so, with respect to the amic acid unit of polyamic acid. By using the imidization catalyst, the physical properties of the resulting polyimide, particularly the elongation and the tensile strength, may be improved.

Further, in the oligomer production step of the present invention, in order to efficiently remove water generated by the imidization reaction, an azeotropic solvent can be added to the organic solvent. As the azeotropic solvent, for example, an aromatic hydrocarbon such as toluene, xylene or solvent naphtha, or an alicyclic hydrocarbon such as cyclohexane, methylcyclohexane or dimethyl cyclohexane can be used. When an azeotropic solvent is used, it is added in an amount of 1 to 30% by mass or so, preferably 5 to 20% by mass, with respect to the total amount of the organic solvent.

<Chemical Imidization Method>

In cases where the oligomer of the present invention is produced by a chemical imidization method, in the oligomer production step of copolymerizing the components (A) and (B), for example, in organic solvent, a dehydrating agent such as acetic anhydride and a catalyst such as triethylamine, pyridine, picoline or quinoline are added to a polyamic acid solution, and the same operations as in the thermal imidization method are subsequently performed. By this, the polyimide oligomer of the present invention can be obtained. In cases where the oligomer of the present invention is produced by such a chemical imidization method, the polymerization temperature and the polymerization time are usually preferred to be in a range of normal temperature to about 150° C. and 1 to 200 hours.

In the production of the oligomer of the present invention, a dehydrating agent is used, and the dehydrating agent is preferably an organic acid anhydride such as an aliphatic acid anhydride, an aromatic acid anhydride, an alicyclic acid anhydride or a heterocyclic acid anhydride, or a mixture of two or more thereof. Specific examples of the organic acid anhydride include acetic anhydride.

In the production of the oligomer of the present invention, an imidization catalyst and organic solvent are also used, and these can be the same ones as those used in the thermal imidization method.

<Polyimide Copolymer Production Step>

Next, the polyimide copolymer production step according to the present invention will be described.

The polyimide copolymer production step of the present invention is a step of producing a polyimide copolymer by copolymerizing the oligomer of polyimide copolymer produced in the oligomer production step and (C) a second acid dianhydride. In this step, either the above-described thermal imidization method or chemical imidization method can be employed. In the polyimide copolymer production step of the present invention, as described below, (D) second diamine and/or diisocyanate may also be copolymerized with the oligomer of polyimide copolymer along with the (C) second acid dianhydride. It is noted here that, as described above, the acid dianhydride and the diamine and/or diisocyanate that are used in the polyimide copolymer production step of the present invention may also contain an acid dianhydride and a diamine and/or a diisocyanate other than the (C) second acid dianhydride and the (D) second diamine and/or diisocyanate, to such an extent that does not impair the solubility, storage stability and heat resistance of the polyimide copolymer of the present invention.

In cases where the polyimide copolymer production step of the present invention is carried out by the thermal imidization method, it is preferred that the polymerization temperature be 150 to 200° C. and the polymerization time be 60 to 600 minutes. When the polymerization temperature is higher than 200° C., oxidation of the solvent and unreacted materials occurs and the resin concentration is increased due to evaporation of the solvent, which are not preferred. Meanwhile, when the polymerization temperature is lower than 150° C., there may be a case where the imidization reaction does not progress or is not completed, which is also not preferred.

In the polyimide copolymer production step of the present invention as well, the copolymerization is carried out in organic solvent, and the organic solvent used in this process can be the same one as used in the above-described oligomer production step. Further, as in the oligomer production step, a known imidization catalyst can be used. Moreover, in the polyimide copolymer production step of the present invention, in order to efficiently remove water generated by the imidization reaction, an azeotropic solvent can also be added to the organic solvent.

In the polyimide copolymer production step of the present invention, the polymerization can be carried out by any known method and the polymerization method is not particularly restricted. For example, a method in which the entire amount of the above-described oligomer is added to organic solvent in advance and polymerization is carried out by subsequently adding the above-described diamine and/or diisocyanate to this organic solvent in which the oligomer component has been dissolved may be employed, or a method in which the entire amount of the above-described diamine is added to organic solvent in advance and polymerization is carried out by subsequently adding the above-described oligomer to this organic solvent in which the diamine has been dissolved may be employed.

In the polyimide copolymer production step of the present invention, as described above, (D) second diamine and/or diisocyanate may also be copolymerized with the oligomer of polyimide copolymer along with the (C) second acid dianhydride. It is preferred that the (C) second acid dianhydride be at least one selected from the group consisting of 3,3',4,4'-biphenyltetracarboxylic dianhydride, 4,4'-oxydiphthalic dianhydride, diphenylsulfone-3,3',4,4'-tetracarboxylic dianhydride, 3,3',4,4'-benzophenonetetracarboxylic dianhydride, 2,2'-bis[(dicarboxyphenoxy)phenyl]propane dianhydride and ethylene glycol-bis-trimellitic anhydride ester.

Further, in the polyimide copolymer production step of the present invention, the (D) second diamine and/or diisocyanate is preferably at least one selected from the group consisting of compounds represented by the following Formulae (3) to (12):

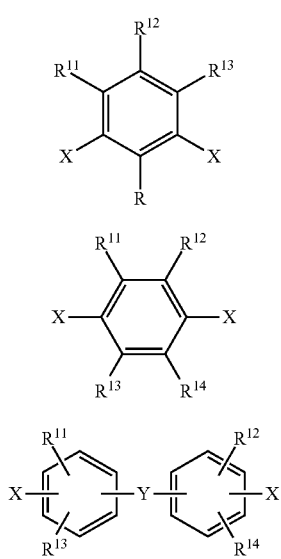
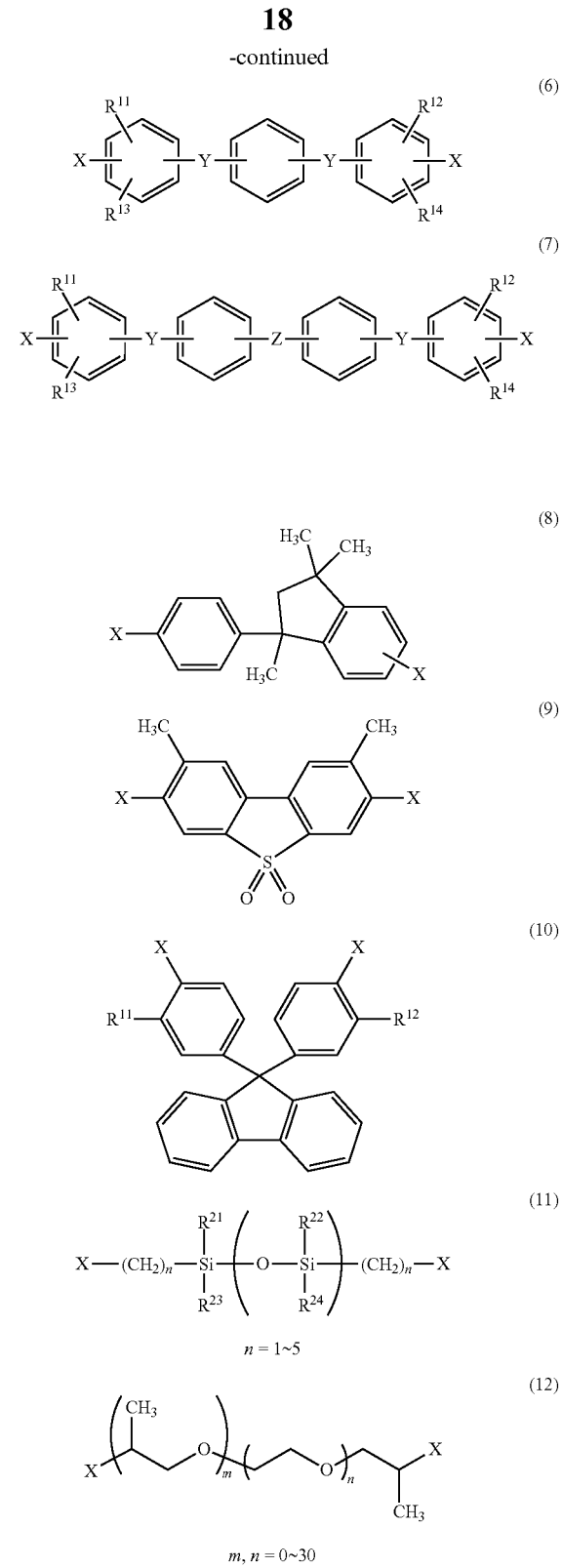

(wherein, X represents an amino group or an isocyanate group; $R^{11}$ to $R^{14}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group; Y and Z each represent

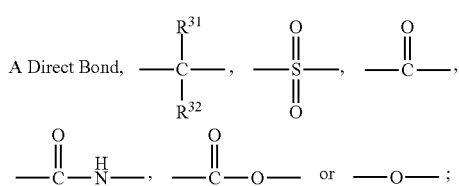

$R^{21}$ to $R^{24}$ each independently represent an alkyl group having 1 to 4 carbon atoms or a phenyl group; $R^{31}$ and $R^{32}$

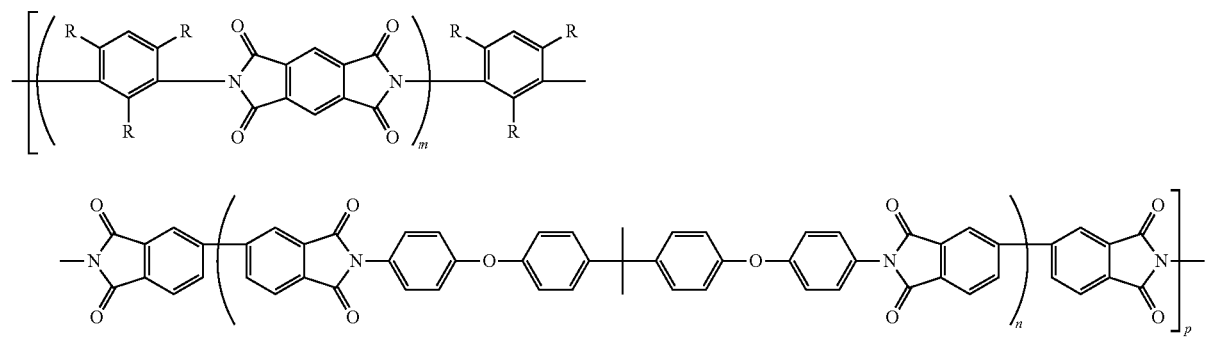

each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group).

It is important that the method of producing a polyimide copolymer according to the present invention comprise the above-described oligomer production step and polyimide copolymer production step, and known methods can be employed for other processes.

EXAMPLES

The present invention will now be described in more detail by way of examples thereof.

Example 1

To a 500 mL separable four-necked flask equipped with a stainless steel anchor stirrer, a nitrogen-introducing tube and a Dean-Stark trap, 24.21 g (0.11 mol) of PMDA, 26.39 g (0.15 mol) of DETDA (a mixture of 2,4-diethyl-6-methyl-1,3-phenylenediamine and 4,6-diethyl-2-methyl-1,3-phenylenediamine), 100 g of N-methyl-2-pyrrolidone (NMP), 2.93 g of pyridine and 60 g of toluene were loaded, and the atmosphere in the reaction system was replaced with nitrogen. The reaction mixture was stirred for 30 minutes at 80° C. under nitrogen gas flow to dissolve PMDA, and the resultant was then heated to 180° C. and stirred under heating for 2 hours. Water generated by the reaction was removed from the reaction system by azeotropic distillation with toluene.

Next, after cooling the reaction system to 130° C., 21.77 g (0.07 mol) of BPDA and 62.68 g of NMP were added and the resultant was stirred for 5 minutes. Then, 15.19 g (0.04 mol) of BAPP and 80 g of NMP were further added, and the resulting mixture was heated to 180° C. and allowed to react for 6 hours under heating and stirring. Water generated by this reaction was removed from the reaction system as an azeotropic mixture with toluene and pyridine. After the completion of the reaction, 80.89 g of NMP was added when the reaction system was cooled to 120° C., thereby obtaining a polyimide solution having a concentration of 20% by mass. The thus obtained polyimide copolymer had a structure represented by the following Formula (14):

(14)

(wherein, two of three Rs of DETDA are ethyl groups and the other R is a methyl group).

Example 2

To the same apparatus as used in Example 1, 32.72 g (0.15 mol) of PMDA, 35.66 g (0.20 mol) of DETDA, 90 g of NMP, 3.96 g of pyridine and 50 g of toluene were loaded, and the atmosphere in the reaction system was replaced with nitrogen. The reaction mixture was stirred for 30 minutes at 80° C. under nitrogen gas flow to dissolve PMDA, and the resultant was then heated to 180° C. and stirred under heating for 2 hours. Water generated by the reaction was removed from the reaction system by azeotropic distillation with toluene.

Next, after cooling the reaction system to 130° C., 29.75 g (0.10 mol) of BPDA and 50 g of NMP were added and the resultant was stirred for 5 minutes. Then, 12.42 g (0.05 mol) of 4,4'-diaminodiphenylsulfone (pDDS) and 47.95 g of NMP were further added, and the resulting mixture was heated to 180° C. and allowed to react for 6 hours under heating and stirring. Water generated by this reaction was removed from the reaction system as an azeotropic mixture with toluene and pyridine. After the completion of the reaction, 115.66 g of NMP was added when the reaction system was cooled to 120° C., thereby obtaining a polyimide solution having a concentration of 25% by mass. The thus obtained polyimide copolymer had a structure represented by the following Formula (15):

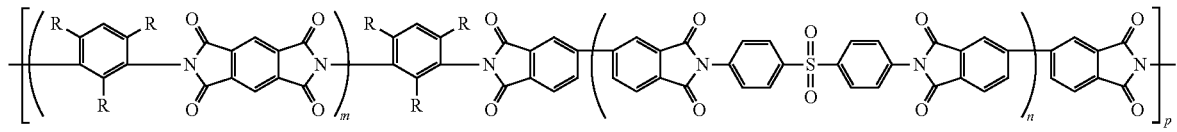

(15)

(wherein, two of three Rs of DETDA are ethyl groups and the other R is a methyl group).

Example 3

To the same apparatus as used in Example 1, 30.76 g (0.141 mol) of PMDA, 33.52 g (0.188 mol) of DETDA, 90 g of NMP, 3.72 g of pyridine and 50 g of toluene were loaded, and the atmosphere in the reaction system was replaced with nitrogen. The reaction mixture was stirred for 30 minutes at 80° C. under nitrogen gas flow to dissolve PMDA, and the resultant was then heated to 180° C. and stirred under heating for 2 hours. Water generated by the reaction was removed from the reaction system by azeotropic distillation with toluene.

Next, after cooling the reaction system to 130° C., 27.98 g (0.094 mol) of BPDA and 50 g of NMP were added and the resultant was stirred for 5 minutes. Then, 16.38 g (0.047 mol) of 9,9-bis(4-aminophenyl)fluorene (FDA) and 45.41 g of NMP were further added, and the resulting mixture was heated to 180° C. and allowed to react for 6 hours under heating and stirring. Water generated by this reaction was removed from the reaction system as an azeotropic mixture with toluene and pyridine. After the completion of the reaction, 114.10 g of NMP was added when the reaction system was cooled to 120° C., thereby obtaining a polyimide solution having a concentration of 25% by mass. The thus obtained polyimide copolymer had a structure represented by the following Formula (16):

NMP, 3.96 g of pyridine and 50 g of toluene were loaded, and the atmosphere in the reaction system was replaced with nitrogen. The reaction mixture was stirred for 30 minutes at 80° C. under nitrogen gas flow to dissolve PMDA, and the resultant was then heated to 180° C. and stirred under heating for 1.5 hours. Water generated by the reaction was removed from the reaction system by azeotropic distillation with toluene.

Next, after cooling the reaction system to 130° C., 29.74 g (0.10 mol) of BPDA and 50 g of NMP were added, and the resultant was heated to 180° C. and stirred under heating for 1.5 hours. Water generated by this reaction was removed from the reaction system by azeotropic distillation with toluene. Then, the reaction system was cooled again to 130° C., and 10.01 g (0.05 mol) of pDADE and 43.49 g of NMP were added. The resulting mixture was heated to 180° C. and allowed to react for 4.5 hours under heating and stirring. Water generated by this reaction was removed from the reaction system as an azeotropic mixture with toluene and

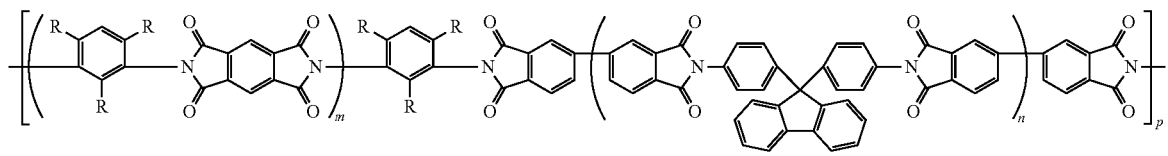

(16)

(wherein, two of three Rs of DETDA are ethyl groups and the other R is a methyl group).

Example 4

To the same apparatus as used in Example 1, 32.72 g (0.15 mol) of PMDA, 35.66 g (0.20 mol) of DETDA, 90 g of pyridine. After the completion of the reaction, 112.91 g of NMP was added when the reaction system was cooled to 120° C., thereby obtaining a polyimide solution having a concentration of 25% by mass. The thus obtained polyimide copolymer had a structure represented by the following Formula (17):

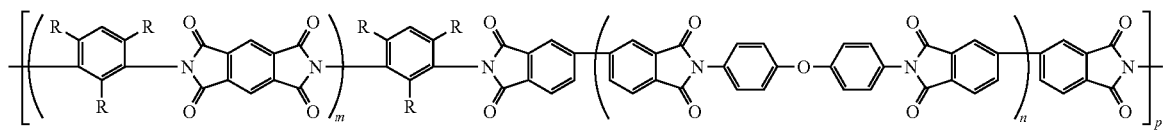

(17)

(wherein, two of three Rs of DETDA are ethyl groups and the other R is a methyl group).

Comparative Example 1

To the same apparatus as used in Example 1, 30.54 g (0.14 mol) of PMDA, 24.96 g (0.14 mol) of DETDA, 201.81 g of NMP, 2.22 g of pyridine and 50 g of toluene were loaded, and the atmosphere in the reaction system was replaced with nitrogen. The reaction mixture was stirred for 30 minutes at 80° C. under nitrogen gas flow to dissolve PMDA, and the resultant was then heated to 180° C. and stirred under heating for 6 hours. Water generated by the reaction was removed from the reaction system as an azeotropic mixture with toluene and pyridine. After the completion of the reaction, the reaction system was cooled to room temperature to obtain a polyimide solution having a concentration of 20% by mass.

Comparative Example 2

To the same apparatus as used in Example 1, 46.58 g (0.13 mol) of diphenylsulfone-3,3',4,4'-tetracarboxylic dianhydride (DSDA), 56.22 g (0.13 mol) of 4,4'-sulfonylbis(p-phenoxyaniline) (pBAPS), 182.22 g of NMP, 2.06 g of pyridine and 50 g of toluene were loaded, and the atmosphere in the reaction system was replaced with nitrogen. The reaction mixture was stirred for 30 minutes at 80° C. under nitrogen gas flow to dissolve DSDA, and the resultant was then heated to 180° C. and stirred under heating for 6 hours. Water generated by the reaction was removed from the reaction system as an azeotropic mixture with toluene and pyridine. After the completion of the reaction, 112.13 g of NMP was added when the reaction system was cooled to 120° C., thereby obtaining a polyimide solution having a concentration of 25% by mass.

Comparative Example 3

To the same apparatus as used in Example 1, 38.25 g (0.13 mol) of BPDA, 56.22 g (0.13 mol) of pBAPS, 269.37 g of NMP, 2.06 g of pyridine and 50 g of toluene were loaded, and the atmosphere in the reaction system was replaced with nitrogen. The reaction mixture was stirred for 30 minutes at 80° C. under nitrogen gas flow to dissolve BPDA, and the resultant was then heated to 180° C. and stirred under heating for 6 hours. Water generated by the reaction was removed from the reaction system as an azeotropic mixture with toluene and pyridine. After the completion of the reaction, 192.40 g of NMP was added when the reaction system was cooled to 120° C., thereby obtaining a polyimide solution having a concentration of 20% by mass.

Comparative Example 4

To the same apparatus as used in Example 1, 34.90 g (0.16 mol) of PMDA, 49.68 g (0.16 mol) of 4'-methylenebis(2,6-diethylaniline), 315.24 g of NMP, 2.53 g of pyridine and 50 g of toluene were loaded, and the atmosphere in the reaction system was replaced with nitrogen. The reaction mixture was stirred for 30 minutes at 80° C. under nitrogen gas flow to dissolve PMDA, and the resultant was then heated to 180° C. to initiate reaction; however, the resin component precipitated one hour after the initiation of the reaction and the reaction solution was completely hardened.

Comparative Example 5

To the same apparatus as used in Example 1, 30.54 g (0.14 mol) of PMDA, 51.32 g (0.16 mol) of 4,4'-methylenebis(2,6-diisopropylaniline), 307.26 g of NMP, 2.22 g of pyridine and 50 g of toluene were loaded, and the atmosphere in the reaction system was replaced with nitrogen. The reaction mixture was stirred for 30 minutes at 80° C. under nitrogen gas flow to dissolve PMDA, and the resultant was then heated to 180° C. to initiate reaction; however, the resin component precipitated 1.5 hours after the initiation of the reaction and the reaction solution became markedly turbid.

<Storage Stability>

The polyimide copolymer solutions obtained in Examples and Comparative Examples were each left to stand for 7 days, and the presence or absence of gelation, turbidity or the like was visually evaluated. An evaluation "○" was given when the solution showed no gelation or turbidity, whereas an evaluation "x" was given when gelation occurred in the solution or the polyimide copolymer precipitated. The results thereof are shown in Tables 1 and 2 below.

<Film-Forming Property>

The polyimide copolymers obtained in Examples and Comparative Examples were each coated on a silicon wafer by a spin coating method and then pre-dried for 10 minutes on a 120° C. hot plate. The resulting pre-dried film was detached from the silicon wafer, fixed on a stainless steel frame and dried at 180° C. for 1 hour, at 250° C. for 30 minutes and then at 320° C. for 1 hour. As for the evaluation of the film-forming property, an evaluation "x" was given when the pre-dried film was in a state of not being able to maintain a film shape by itself prior to the completion of the drying at 250° C., whereas an evaluation "○" was given when the pre-dried film was able to maintain a film shape by itself even after the completion of the drying at 250° C. The results thereof are shown in Tables 1 and 2.

<Glass Transition Temperature>

Using the films prepared for the evaluation of the film-forming property, the glass transition temperature was measured. For the measurement, DSC6200 (manufactured by Seiko Instruments Inc.) was employed. Each film was heated to 500° C. at a heating rate of 10° C./min, and the intermediate glass transition temperature was adopted as the glass transition temperature. The obtained results are shown in Tables 1 and 2.

<Softening Point>

Using the films prepared for the evaluation of the film-forming property, the temperature dependency of the elastic modulus was measured. For the measurement, TMA4000S (manufactured by Mac-Science Co., Ltd.) was employed. Since a rapid decrease in the elastic modulus means a reduction in the mechanical strength, the temperature at this point means the use limit of the subject film as a material. The obtained results are shown in Tables 1 and 2 and FIG. 1.

<5% Thermal Weight Reduction Temperature>

Using the films prepared for the evaluation of the film-forming property, the 5% thermal weight reduction temperature was measured. For the measurement, TG/DTA6200 (manufactured by Seiko Instruments Inc.) was employed. As for the heating condition, each film was heated at a rate of 10° C./min, and the temperature at which the mass was reduced by 5% was measured and defined as the 5% thermal weight reduction temperature. The obtained results are shown in Tables 1 and 2

<Mechanical and Physical Properties>

The films prepared for the evaluation of the film-forming property were each processed into a test piece, and the tensile elastic modulus, tensile strength and elongation were measured using a creep meter (RE2-33005B, manufactured by Yamaden Co., Ltd.). Each measurement was performed 5 times, and the data showing the maximum tensile strength was adopted. The chuck distance was 50 mm and the tensile rate was 5 mm/sec.

TABLE 1

|  | Example 1 | Example 2 | Example 3 | Example 4 |
|---|---|---|---|---|
| Storage stability | ○ | ○ | ○ | ○ |
| Film-forming property | ○ | ○ | ○ | ○ |
| Glass transition temperature (° C.) | 500 or higher | 500 or higher | 500 or higher | 500 or higher |
| Softening point (° C.) | 500 or higher | 500 or higher | 500 or higher | 500 or higher |
| 5% weight loss (° C.)* | 508.2 | 493.7 | 517.1 | 499.0 |
| Tensile elastic modulus (GPa) | 1.76 | 1.88 | 1.63 | 1.97 |
| tensile strength (MPa) | 81.7 | 82.3 | 80.7 | 63.9 |
| Elongation (%) | 9.0 | 10.8 | 11.0 | 7.8 |

*5% thermal weight reduction temperature

TABLE 2

|  | Comparative Example 1 | Comparative Example 2 | Comparative Example 3 | Comparative Example 4 | Comparative Example 5 |
|---|---|---|---|---|---|
| Storage stability | ○ | ○ | ○ | x | x |
| Film-forming property | ○ | ○ | ○ | x | x |
| Glass transition temperature (° C.) | 450 or higher | 283 | 266 | — | — |
| Softening point (° C.) | 450 or higher | 291 | 267 | — | — |
| 5% weight loss (° C.) | 425.8 | 511.2 | 490 | — | — |
| Tensile elastic modulus (GPa) | 1.62 | 1.65 | 1.89 | — | — |
| tensile strength (MPa) | 34.7 | 75.3 | 83.6 | — | — |
| Elongation (%) | 5.8 | 8.2 | 9.2 | — | — |

From Tables 1 and 2 and FIG. 1, it is seen that the polyimide copolymers of the present invention had excellent solvent solubility, storage stability, heat resistance and mechanical strength. In contrast, in Comparative Example 1, since the components (A) and (B) were used, the storage stability, glass transition temperature and softening point were comparable to those of the polyimide copolymers of the present invention; however, since the component (C) was not used, the thermal decomposition temperature was low and the mechanical strength was poor. Further, since the polyimide copolymers of Comparative Examples 2 and 3 were constituted only by the components (C) and (D), although the storage stability, mechanical strength and thermal decomposition temperature were comparable to those of the polyimide copolymers of the present invention, the glass transition temperature and softening point were both low; therefore, these polyimide copolymers of Comparative Examples 2 and 3 do not withstand practical use. The polyimide copolymers of Comparative Examples 4 and 5 had a structure in which the component (B) was dimerized and were thus presumed to be capable of ensuring a solubility comparable to that of the oligomer of polyimide copolymer of the present invention; however, free rotation of the two benzene rings allowed the molecular chains to aggregate, so that the component (A) could not be dissolved.

The invention claimed is:
1. A polyimide copolymer, obtained by copolymerizing an oligomer of polyimide copolymer, which is obtained by copolymerizing (A) a pyromellitic dianhydride and (B) at least one diamine and/or diisocyanate represented by the following Formula (1) or (2):

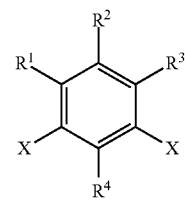

(1)

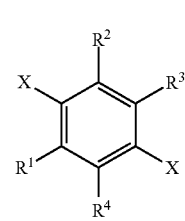

(2)

wherein, X represents an amino group or an isocyanate group, and two of $R^1$ to $R^4$ in said Formula (1) or (2) of said (B) are ethyl groups and the other two are a methyl group and a hydrogen atom; and with (C) second acid dianhydride different from said (A), wherein said (C) second acid dianhydride is at least one selected from the group consisting of 3,3',4,4'-biphenyltetracarboxylic dianhydride, 4,4'-oxydiphthalic dianhydride, diphenylsulfone-3,3',4,4'-tetracarboxylic dianhydride, 2,2'-bis[(dicarboxyphenoxy)phenyl]propane dianhydride and ethylene glycol-bis-trimellitic anhydride ester, and wherein the polyimide copolymer does not have a glass transition temperature below 500° C., and is solvent soluble.

2. The polyimide copolymer according to claim 1, wherein said oligomer of polyimide copolymer has amino group-terminals.

3. The polyimide copolymer according to claim 1, wherein, as (D) second diamine and/or diisocyanate, at least one selected from the group consisting of compounds represented by the following Formulae (3) to (12):

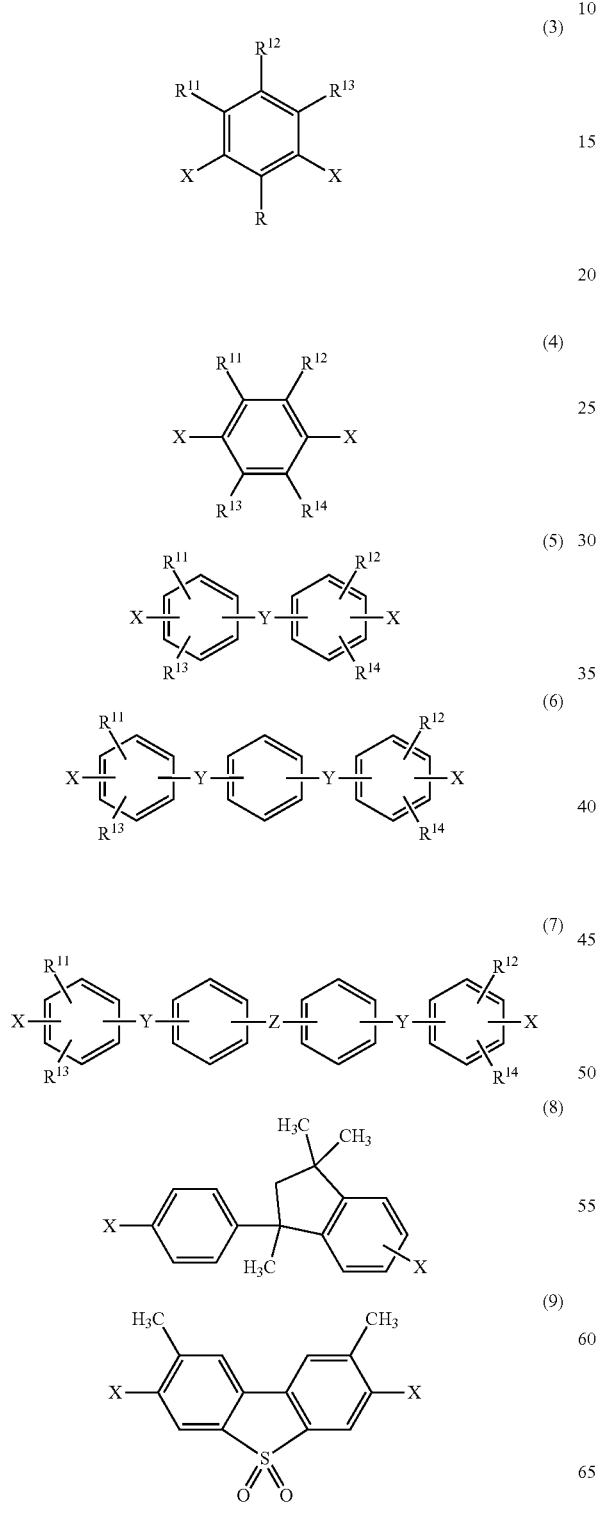

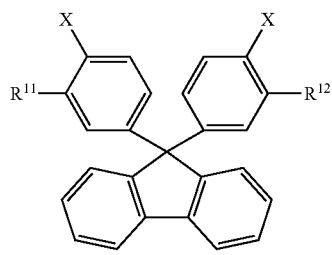

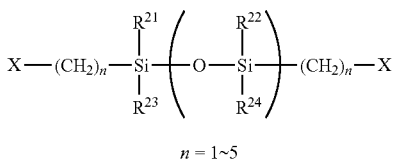

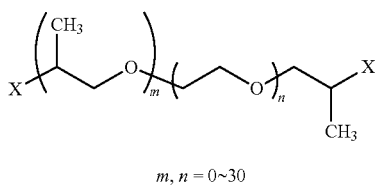

wherein, X represents an amino group or an isocyanate group; $R^{11}$ to $R^{14}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group; Y and Z each represent

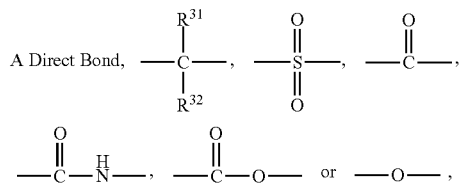

$R^{21}$ to $R^{24}$ each independently represent an alkyl group having 1 to 4 carbon atoms or a phenyl group; $R^{31}$ and $R^{32}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group is copolymerized with said oligomer of polyimide copolymer along with said (C) second acid dianhydride.

4. A method of producing a polyimide copolymer, said method comprising:

the oligomer production step of producing an oligomer of polyimide copolymer by copolymerizing (A) a pyromellitic dianhydride and (B) at least one diamine and/or diisocyanate represented by the following Formula (1) or (2):

(1)
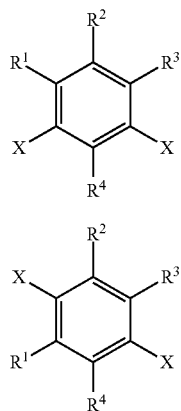

(2)
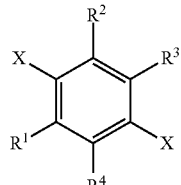

wherein, X represents an amino group or an isocyanate group, and wherein two of $R^1$ to $R^4$ in said Formula (1) or (2) of said (B) are ethyl groups and the other two are a methyl group and a hydrogen atom; and the polyimide copolymer production step of producing a polyimide copolymer by copolymerizing (C) second acid dianhydride different from said (A) with said oligomer of polyimide copolymer produced in said oligomer production step, wherein said (C) second acid dianhydride is at least one selected from the group consisting of 3,3',4,4'-biphenyltetracarboxylic dianhydride, 4,4'-oxydiphthalic dianhydride, diphenylsulfone-3,3',4,4'-tetracarboxylic dianhydride, 2,2'-bis[(dicarboxyphenoxy)phenyl]propane dianhydride and ethylene glycol-bis-trimellitic anhydride ester, and wherein the polyimide copolymer is solvent soluble.

5. The method of producing a polyimide copolymer according to claim 4, wherein said oligomer production step is carried out in organic solvent in the presence of a catalyst at a temperature of 150 to 200° C.

6. The method of producing a polyimide copolymer according to claim 4, wherein (D) is at least one selected from the group consisting of compounds represented by the following Formulae (3) to (12):

(3)
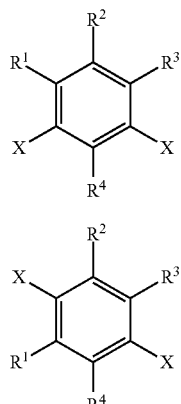

(4)
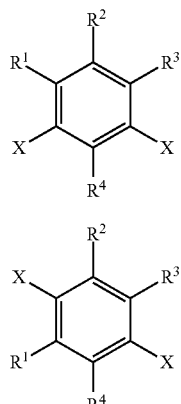

(5)
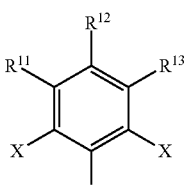

(6)
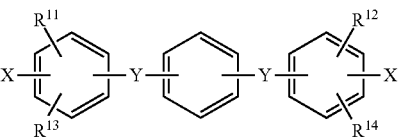

(7)
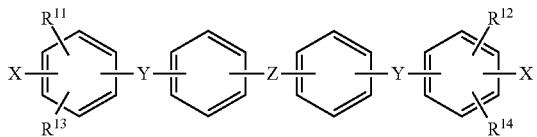

(8)
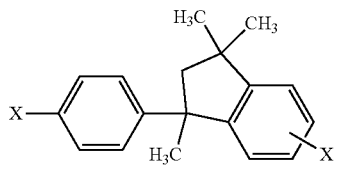

(9)
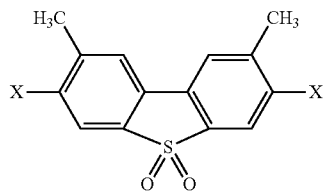

(10)
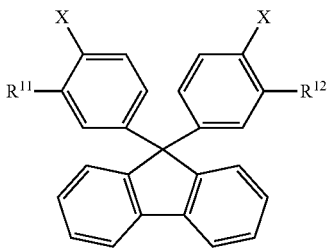

(11)
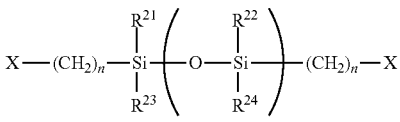

$n = 1\sim5$

(12)
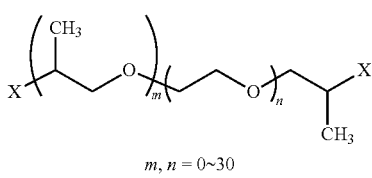

$m, n = 0\sim30$ wherein, X represents an amino group or an isocyanate group; $R^{11}$ to $R^{14}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group; Y and Z each represent

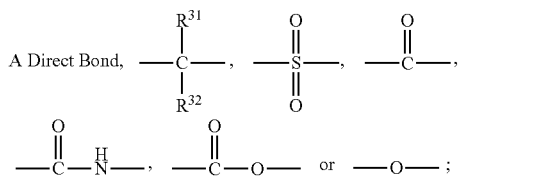

$R^{21}$ to $R^{24}$ each independently represent an alkyl group having 1 to 4 carbon atoms or a phenyl group; $R^{31}$ and $R^{32}$ each independently represent a hydrogen atom, an alkyl group having 1 to 4 carbon atoms, an alkenyl group having 2 to 4 carbon atoms, an alkoxy group having 1 to 4 carbon atoms, a hydroxyl group, a carboxy group or a trifluoromethyl group is copolymerized with said oligomer of polyimide copolymer along with said (C) second acid dianhydride.

7. A polyimide copolymer, obtained by copolymerizing an oligomer of polyimide copolymer, which is obtained by copolymerizing (A) a pyromellitic dianhydride and (B) DETDA with (C) BPDA, and wherein the polyimide copolymer does not have a glass transition temperature below 500° C., and is solvent soluble.

* * * * *